United States Patent [19]

Menne

[11] 3,814,349

[45] June 4, 1974

[54] DUAL DRAG FOR FISHING REELS

[75] Inventor: Eugene P. Menne, Mankato, Minn.

[73] Assignee: Johnson Diversified, Inc., Mankato, Minn.

[22] Filed: June 30, 1972

[21] Appl. No.: 268,155

[52] U.S. Cl............................ 242/217, 242/84.2 A
[51] Int. Cl............................................. A01k 89/02
[58] Field of Search..... 215/215; 216/216; 217/217; 21/211, 212, 213, 214, 218, 219, 220; 64/30 R, 30 C

[56] References Cited
UNITED STATES PATENTS

| | | | |
|---|---|---|---|
| 2,918,227 | 12/1959 | Mauhorgne | 242/84.21 R |
| 3,154,264 | 10/1964 | Johnson | 242/219 |
| 3,167,272 | 1/1965 | Frode | 242/213 |
| 3,478,977 | 11/1969 | Sarah | 242/212 |
| 3,600,964 | 8/1971 | Sarah | 242/219 |

Primary Examiner—Billy S. Taylor

[57] ABSTRACT

A dual drag drive mechanism for a fishing reel having a driving shaft for a line spooling member, a crank shaft for rotating the driving shaft, a pair of friction drag units one associated with each of said shafts, and means for independently and selectively adjusting the resistance produced by each of the units. The drag unit for the crank shaft is operative, by releasing winding pressure on the crank shaft, to permit slippage when the fisherman wants to allow the fish to run under tension that is determined by a star wheel adjustment. The drag unit for the driving shaft is operative to permit slippage in either direction at a pre-set degree of resistance below the tension limit of the line selected for use in the reel.

5 Claims, 2 Drawing Figures

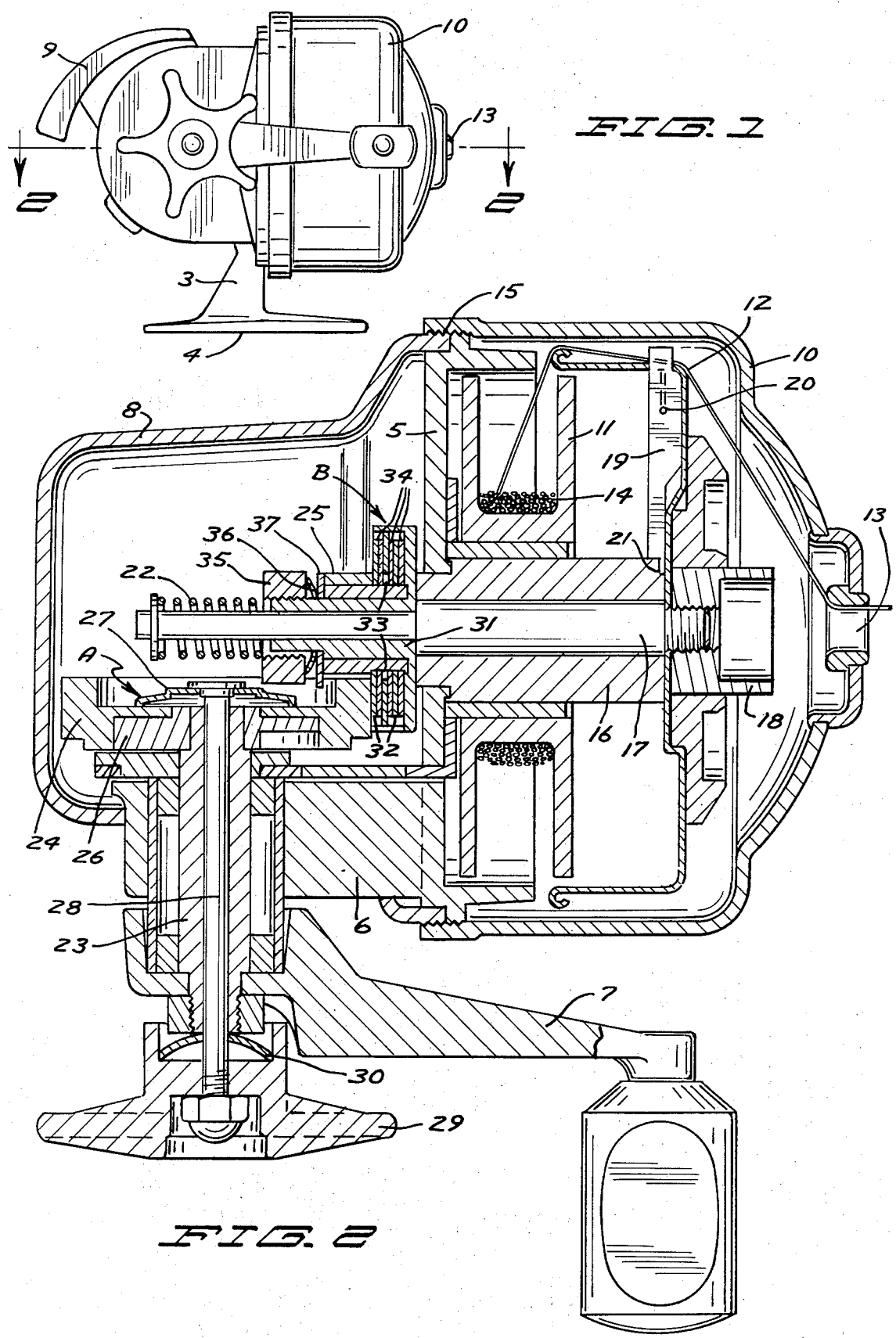

DUAL DRAG FOR FISHING REELS

This invention relates to fishing reels of the spinning type and the primary object is to provide such a reel with a pair of separate and independently adjustable but closely coordinated drag mechanisms which are so designed and arranged that they will give the operator better control of a hooked fish during the line retrieving operator than has heretofore been possible.

More particularly the invention contemplates the use of a primary or star wheel drag, that is locked into the direct drive, as shown in Johnson U.S. Pat. No. 3,487,658 and No. 3,154,264 issued to the assignee of the present invention, and each of which embodies a frictional coupling or clutch in the drive connection between the winding crank and the line spooling element. With this device, when a fish is on and when one is retrieving, the drive shaft will slip only when the fish provides greater resistance than what the drag is set for, thereby preventing line breakage, even while the crank shaft is locked into direct drive, it being understood that merely releasing pressure on the crank handle allows the drive gear to rotate under friction adjusted by the star wheel.

To provide for a further retrieving contingency, however, the present invention contemplates the use of a secondary and independently adjustable drag mechanism that utilizes some of the aforesaid drive connection but permits the operator to easily and quickly transfer the resistance produced by pull of the fish from the primary drag to a secondary friction clutch without going through the drive gears and crank handle connections. This contingency arises when the fisherman desires to let a strong or heavy fish run with enough resistance to retain the hook safely imbedded and without using all the primary drag mechanisms or requiring manual snubbing of the line until the fish has become sufficiently tired.

It may here be noted that in my copending application Ser. No. 179,930, filed Sept. 13, 1971, and now abandoned, I have disclosed a fishing reel of the spinning type in which two variable friction drag mechanisms are employed, but in a different arrangement and with respect to which the present construction is found to be superior in several respects.

In the accompanying drawing, illustrating a preferred embodiment of the present invention;

FIG. 1 is a side elevation of a spinning reel incorporating the invention but showing only the essential exposed parts;

FIG. 2 is an enlarged sectional view taken on the line 2—2 in FIG. 1.

Referring to the drawing more particularly and by reference characters 3 designates the frame of the reel having a mounting tang 4 and an inner circular plate 5 with a rearwardly extending integral lug extension 6 serving as a bearing support for the shaft of an exposed crank 7. The reel housing includes a rear cover 8, in which is pivotally mounted a control lever 9, and a front cover 10 which encloses the line spool 11, a line spooling member 12, and an eyelet 13 through which the line 14 is threaded. The two covers 8 and 10 are threaded as at 15 to screw onto each other and so as to firmly but releasably embrace the frame plate 5.

A bearing 16 extending rigidly forwardly from plate 5 slidably and rotatably supports a drive shaft 17 the front end of which carries the rotor or spooling member 12 the same being secured thereto by a nut 18. This nut serves a further purpose in that it is forwardly flanged to cooperate with the eyelet member 13 to control the outward movement of the line when making the cast, as more particularly set forth in Johnson Pat. No. 3,498,562, also owned by this applicant's assignee.

The spooling member 12 has a line pickup pin 19 that is radially movable in response to a spring 20, and to a cam 21 on bearing 16, so as to project the pin into line engagement, when the shaft 17 is moved rearward under action of spring 22 at the rear of the shaft. And the pin 19 is retracted out of line contact by the spring 20 when the drive shaft 17 is moved forwardly under the action of the thumb lever 9, all in a well known manner.

Drive shaft 17 and spooling member 12 are rotated in line winding direction by the crank 7 that is mounted on tubular crank shaft 23, journaled in bearing 6. Power is transmitted between the shafts through a face gear 24, on shaft 23, intermeshing with pinion 25 on shaft 17, and through correlated primary and secondary drag devices A and B which frictionally connect the gear and pinion to their respective shafts.

The drag A essentially embodies a drive disc 26 fixed on the inner end of crank shaft 23 and disposed within a shallow recess in the back of face gear 24. Driving friction is established between the members 24 and 26 by drag disc 27 on the inner end of rod 28 which extends axially through shaft 23 and out through the hub of crank 7 where it is threaded to receive star wheel 29 acting against a circular drag spring 30.

With this arrangement it will be seen that by turning the exposed star wheel in one direction or the other the operator can quickly and easily control the degree of drag resistance that may be necessary under varying retrieve conditions and as they occur when pulling in a fish.

The so-called secondary or correlated drag mechanism B, that drivingly connects gear driven pinion 25 to shaft 17, includes a drag housing 31 keyed to rotate with drive shaft 17, but permitting the shaft to slide in it. The pinion 25 is rotatable on a hub portion of the housing 31 under friction produced by drag washers 32 which are keyed to an extension of the pinion, while an intermediate drag washer 33 is externally keyed to the drag housing, and friction washers 34 are interposed between washers 32 and 33.

A tension knob 35 is screwed on the rear extremity of the hub of housing 31 for the purpose of squeezing a tension washer spring 36 against the pinion 25, and a washer 37 is keyed to the drag housing to prevent rotation of the spring 36 and tension knob 35 when the pinion gear slips. The frictional resistance produced by drag unit B is regulated by removing the cover 8 and turning the knob 35. This presents no objection as there is relatively little need for changing this resistance once it is set. In other words this drag which permits slippage in either direction is normally pre-set to a desired tension, usually just below the line strength, and consequently an adjustment is not ordinarily required except when a new line of different tensile strength is being installed in the reel.

OPERATION

When a lure is to be cast the operator depresses the thumb piece 9 which moves the drive shaft 17 forward until the line is clamped or snubbed between the spooling member 12 and cover 10, an action that also causes the pin 19 to drop down out of line engagement. And releasing the lever 9 will then free the line and permit flight of the lure until it reaches its destination when the operator instinctively grasps the crank handle 7 to effect retrieval, and it is at this point when the two drags become effective if a fish strikes.

Assuming that a fish of substantial proportion is hooked, the drag B on the drive shaft will slip only when the fish provides greater resistance than what the drag is set for, thereby preventing line breakage. At the same time the drag A on the crank shaft is locked into direct drive, and should the fisherman wish to allow the fish to run, merely releasing hand pressure on the crank will allow the unit to shift into drag with the amount of tension determined by the star wheel adjustment.

Reingaging the crank will of course restore the retrieval operation until such time as the fish has been brought in, and all of which has been accomplished in a smooth and effective operation through a simple mechanism that lends itself to efficient manufacturing procedures.

Having illustrated and described a preferred embodiment of the invention, what I claim to be new and desire to protect by Letters Patent is:

1. In a fishing reel having a drive shaft for rotating a line spooling member, a crank shaft, and gearing operatively connecting the crank shaft to the drive shaft, the improvement which comprises a slip clutch drivingly interposed between the drive shaft and gearing, and a second slip clutch drivingly interposed between the crank shaft and gearing.

2. The reel of claim 1 in which each of the slip clutches includes driving and driven disc elements having frictional engagement with each other.

3. The reel of claim 1 in which said slip clutch between said drive shaft and said gearing is pre-set to provide slippage resistance against pull on the line that is below the tension limit of the line.

4. The reel of claim 1 in which means is provided for independently adjusting said slip clutches to vary the degree of resistance by each of them to line pull tension.

5. The reel of claim 1 in which said drive shaft and said crank shaft are disposed at right angles.

* * * * *